Figure 1:
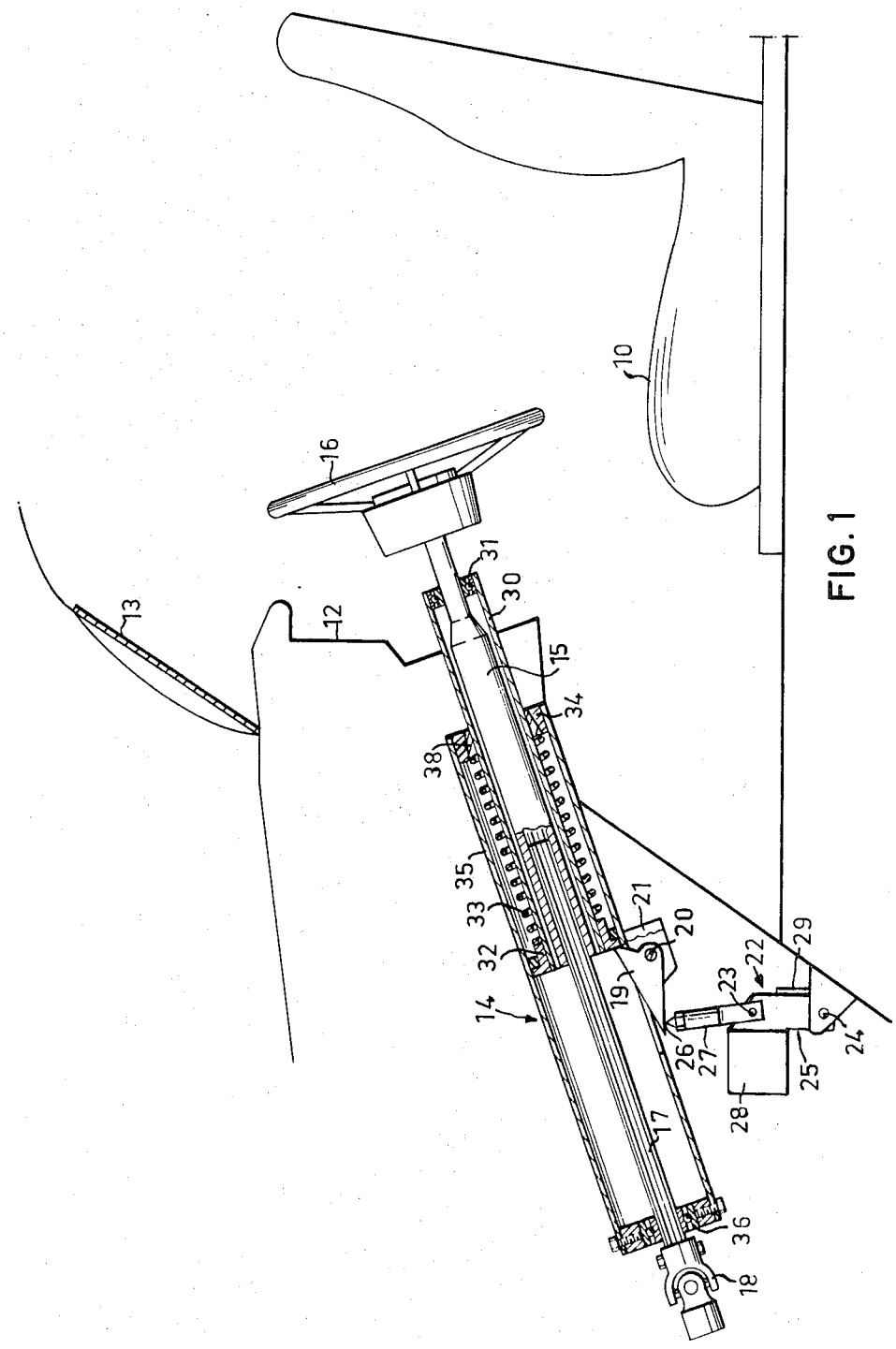

United States Patent [19]
Bane

[11] 3,791,233
[45] Feb. 12, 1974

[54] COLLAPSIBLE VEHICLE-STEERING SYSTEMS

[75] Inventor: Lars Olof Bane, Goteborg, Sweden
[73] Assignee: AB Volvo, Goteborg, Sweden
[22] Filed: Nov. 6, 1972
[21] Appl. No.: 303,946

[52] U.S. Cl. .................................... 74/492, 74/2
[51] Int. Cl. ..................... B62d 1/18, G05g 17/00
[58] Field of Search ............ 74/492, 493; 280/150 B

[56] References Cited
UNITED STATES PATENTS

| | | | |
|---|---|---|---|
| 3,487,710 | 1/1970 | Fergle | 74/492 |
| 3,133,746 | 5/1964 | Zazzara | 280/150 B |
| 3,397,911 | 8/1968 | Brosius | 280/150 B |
| 3,483,768 | 12/1969 | Glass | 74/492 |
| 3,699,824 | 10/1972 | Standenmayer | 74/492 |

FOREIGN PATENTS OR APPLICATIONS 739,676   11/1955   Great Britain ................. 280/150 B Primary Examiner—Allan D. Herrmann
Attorney, Agent, or Firm—Young & Thompson

[57] ABSTRACT

An improved collapsible vehicle-steering system comprising a steering wheel and steering wheel shaft assembly extending between the steering wheel and means for transmitting steering wheel movement to the vehicle wheels. The shaft assembly is divided into an upper section and a lower section arranged for coaxial movement relative to each other. The upper shaft section carries the steering wheel and is freely movable axially from a first steering position to a second safe position and is releasably held in its first steering position by a latch means which co-acts with means sensitive to vehicle retardation forces. The means sensitive to vehicle retardation forces is adapted to actuate the upper shaft section latching means at forces exceeding a predetermined magnitude, to permit axial movement of the upper shaft section relative the lower, from said first position to said second position.

12 Claims, 2 Drawing Figures

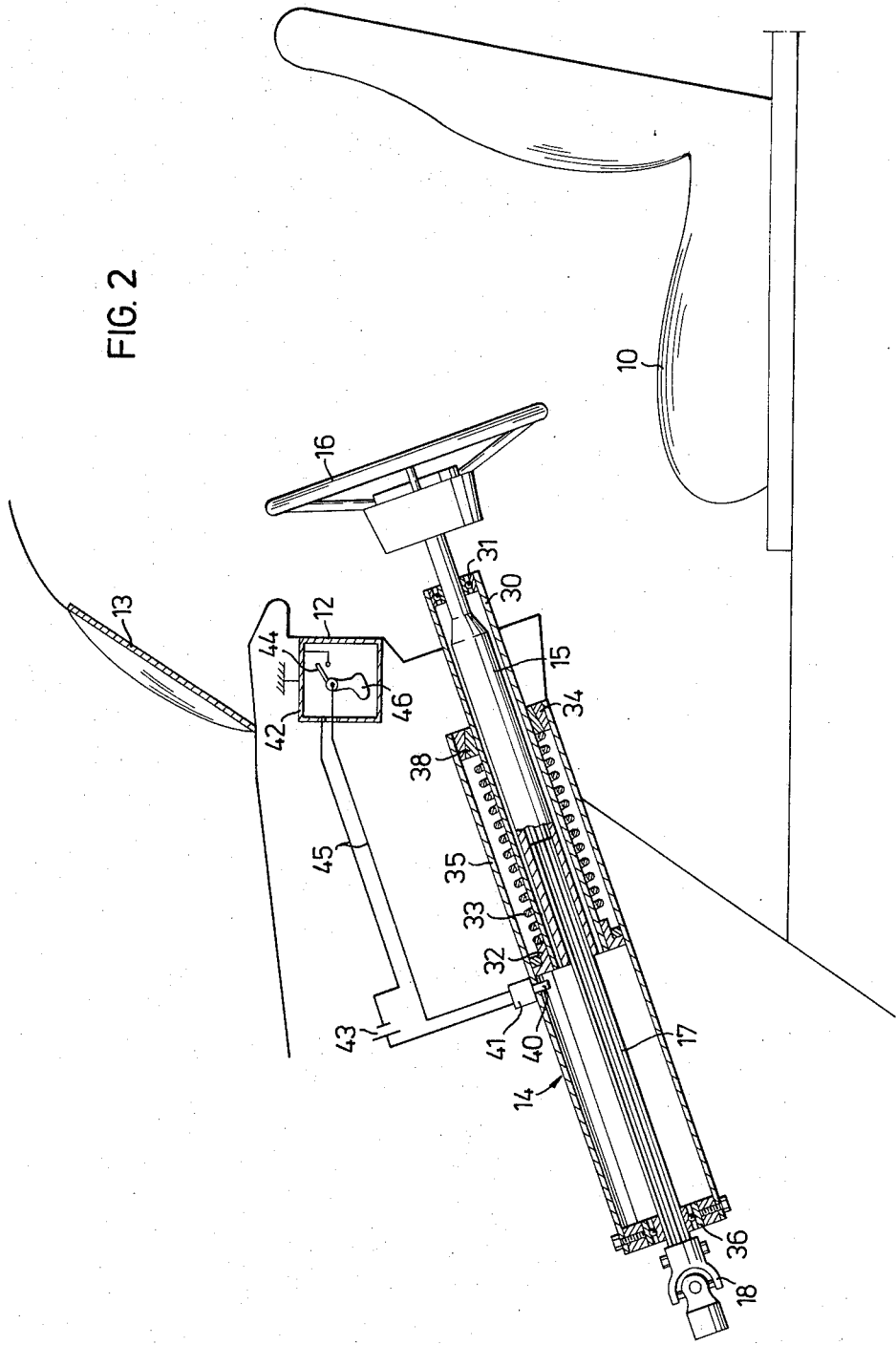

COLLAPSIBLE VEHICLE-STEERING SYSTEMS

The present invention relates to an improvement in collapsible vehicle-steering systems of the type comprising a steering wheel and a steering shaft assembly extending between the steering wheel and movement transmission means for transmitting rotary movement of the steering wheel and the steering shaft assembly to the vehicle wheels, and with which systems the steering shaft assembly is divided into an upper, steering wheel carrying shaft section and a lower steering shaft section arranged for axial movement relative to each other, so that when subjected to impact forces acting generally in the direction of their respective longitudinal axis the shaft sections are able to move axially in a manner to reduce the effect of the impact on the driver of the vehicle.

Serious efforts are being made in the automobile industries to reduce the extent of injuries sustained through automobile collisions, by introducing for example as standard automobile equipment such safety devices as safety belts, self-inflating impact cushions, receding driving instruments, off-line engine installations and collapsible steering systems etc. The present invention relates to this latter type of safety device.

Collapsible steering systems are known to the art with which the steering shaft is divided into an upper steering shaft section, which carries the steering wheel of the vehicle and a lower steering shaft section, and with which the sections are drivingly connected together and arranged to move axially in relation to each other when subjected to heavy impact forces acting substantially in the direction of their longitudinal axis, so that in the event of a collision between two vehicles for example, the lower steering shaft section is able to yield against externally acting forces, such as the impact force on the front portion of the vehicle.

With one such known collapsible steering system, the upper shaft section carrying the steering wheel is axially offset relative the lower shaft section, so that forces acting axially on the lower section cause the same to move parallel to the upper section, whereby the lower shaft section, if acted upon by frontal impact forces of sufficient magnitude is moved upwards outside the line of the driver, while the upper, steering wheel carrying shaft section is forced downwards by the force exerted on the steering wheel by the body of the driver as he is thrown forwards.

One common feature with such collapsible vehicle-steering systems, however, is that only the lower steering shaft section is able to move axially while the upper shaft section is held rigid. While such an arrangement might possibly alleviate injury to the driver of a vehicle as the result of steering wheel impact, it is obvious that personal injury will nevertheless be sustained at the moment of impact between the driver and the steering wheel.

The main object of the invention is to eliminate this hazard and it is proposed in accordance therewith to provide a collapsible vehicle steering system which comprises a steering wheel and a steering shaft assembly extending between the steering wheel and movement transmission means for transmitting rotary movement of the steering wheel and the steering shaft assembly to the vehicle wheels, wherein the steering shaft assembly comprises upper and lower shaft sections arranged for axial movement relative to each other, of which sections the upper section is attached to the steering wheel and arranged for free axial movement from a first, steering position to a second, safe steering position located at least generally remote from the vicinity of possible steering wheel contact with the driver, and further comprising latching means for releaseably holding the upper steering shaft section in said first position, and means sensitive to vehicle retardation forces for releasing said latching means when said vehicle retardation forces exceed a predetermined magnitude, to permit free movement of the upper shaft section to said second, safe position. In this way, it is ensured that minimum injurious bodily contact takes place between the driver of the vehicle and the steering wheel, but that when the vehicle is subjected to frontal impact forces the steering wheel freely moves away from the first steering position to said safe position, substantially out of reach of the body of the driver.

According to one feature of the invention, the upper steering shaft section carrying the steering wheel is capable of moving to the second, safe position under its own weight and that of the steering wheel or under the influence of the mass forces acting on said shaft section and said steering wheel. In certain instances, however, it may be found expedient to provide auxiliary means to ensure rapid and positive movement of the upper steering shaft section to the second, safe position. Accordingly, with one alternative feature of the invention there is arranged a spring which biasses the upper steering shaft section towards the second, safe position.

Further, to prevent possible rebound of the freely movable upper steering shaft section from the second, safe position back towards the normal vehicle steering position it is suitable in certain instances to provide means which prevent movement of the upper steering shaft section towards its normal vehicle steering, once it has moved towards the safe position.

These and other important features of the invention will be apparent from the following description which is given with reference to two embodiments thereof illustrated in the accompanying drawings, in which FIGS. 1 and 2 illustrate diagrammatically part of the driving compartment of a motor vehicle steering system incorporating the principal of the invention.

Illustrated in FIG. 1 of the drawings is a driving seat 10, an instrument panel 11 having disposed therein a recess 12 shaped to accommodate the steering wheel of the vehicle as hereinafter described, and a windscreen 13 of conventional design, forming part of a conventional motor vehicle. Also shown in FIG. 1 is part of a vehicle-steering system 14, comprising an upper steering shaft section 15 attached to a steering wheel 16, and a lower steering shaft section 17 attached to means for transmitting the rotary movement of the steering wheel and the steering shaft to the tie rods of the vehicle. Since the movement transmission means is not concerned with the concept of the present invention it will not be illustrated or described in connection therewith, with the exception of a universal joint 18 shown connected to the bottom of the lower steering shaft section 17 and cooperating with the remainder of the movement transmission means not shown.

In the exemplary embodiments, the upper steering shaft section 15 is of hollow splined construction and is arranged coaxially with the lower splined shaft section 17 for telescopic movement relative thereto. Axial movement of the shaft section 15 relative the shaft section 17 from the illustrated normal vehicle steering position, in which the steering wheel 16 occupies a steering position remote from the instrument panel 11, to a safe position (not shown), in which the steering wheel is accommodated in the recess 12 generally out of the vicinity of possible contact with the driver, is prevented by latching means, which in the first embodiment comprises a latching element 19, pivotally hinged as indicated at 20 to a bracket structure 21 mounted to a suitable part of the vehicle and a toggle link arrangement 22 co-acting with the latching element 19. It should be mentioned that the splined engagement of the upper and lower steering shaft sections is such that the steering wheel can still be used to steer the vehicle when occupying the second safe position. In the first embodiment, the latching element is of triangular configuration. Obviously, the latching element could equally as well be L-shaped, with one surface serving as the active latching component and the other as the component co-acting with the toggle link 19.

The toggle link arrangement has two positions, i.e. a first stable position in which the latching element 19 is held in latching engagement to prevent axial movement of the upper steering shaft section 15 to the safe position at mass forces below a certain predetermined magnitude, and a second position in which the latching element is released and allowed to swing counterclockwise from its latching position to a position in which the upper steering shaft section and the steering wheel 16 are free to move to the safe position, the steering wheel 16 being received in the recess 12 substantially out of range of the lunging body of the driver of the vehicle.

In the first position of the toggle link arrangement, in which the latching member 19 is held in its operative position, the centre pivot point 23 is preferably located to the right as seen in FIG. 1 of an imaginary line passing through the point 24 at which the lower link 25 of the toggle link is anchored to the vehicle and the point 26 at which the upper link 27 of the toggle link contacts the latching element 19. Thus, in order to release the latching element, to permit axial movement of the upper steering shaft section 15 towards the safe position the centre pivot point 23 must be moved across the aforementioned imaginary line, to a position on the left thereof, i.e. to the second position of the toggle link arrangement 22. Accordingly, there is arranged a latch release means, which is the first embodiment has the form of a weight 28 arranged to co-act with the toggle link arrangement 22 in a manner to move the same from its first position to its second position by the inertia forces acting on the weight as the result of vehicle retardation forces exceeding a certain predetermined magnitude. Thus, in the event of a collision, the toggle link is subjected to mass forces exerted by the weight 28 which in the first embodiment is attached to the lower link 25 of the toggle link arrangement 22, and is moved to the second position, thereby releasing the latching element 19 and permitting the steering wheel 16 and the upper steering shaft section 15 to move to the second position as a result of the mass forces acting thereon.

As will be readily perceived, the angle subtended by the links 25,27 at the centre pivot point 23 of the toggle link arrangement 22 should be such as to prevent movement of the arrangement to its second position upon the occurance of minor impact forces, thereby preventing unnecessary release of the latching element 19. At the same time, however, this angle should not be so great as to prevent rapid movement of the toggle link arrangement to the second position when impact forces of a dangerous magnitude are experienced. In other words the angle subtended by the links 25, 27 of the toggle link arrangement adjacent the central pivot point 23, and the weight 28 should be adapted to cause rapid movement of the toggle link arrangement 22 to its second position with impact forces exceeding a predetermined magnitude, and to allow the toggle link arrangement 22 to remain in its first position with impact forces below this magnitude. The positioning of the weight 28 relative the toggle link arrangement 22 and the actual construction and orientation of the toggle link arrangement itself, however, are matters of design choice, the important thing being that the combined arrangement of the toggle link and weight cause practically instantaneous release of the latching element 19 at the very moment of impact. Thus, for example, the lower link 25 of the toggle link arrangement 22 can be supported against rearward movement by stationary stop means 29 mounted behind and adjacent to the lower link attachment means. Alternatively the adjacent ends of links 25 and 27 may be constructed in a manner not shown to prevent unsuitable position of the centre point 23 to the right of the imaginary line passing through the contact point 26 and the attachment point 24.

In certain instances means may be provided to assist the mass forces moving the upper steering shaft section 15, and thus also the steering wheel 16, to the safe position immediately the latching member 19 is released by the latch release means, thereby ensuring positive and rapid movement of the steering wheel 16 into the recess 12.

In both embodiments, the latching element 19 acts on the upper steering shaft section 15 via a sleeve 30 which extends over the section 15 and is arranged for axial movement therewith but is locked against rotation around its own longitudinal axis. As will be seen from the drawings, the upper steering shaft section 15 is journalled in the sleeve 30 in a bearing 31, and the sleeve 30 has fixedly mounted at the end thereof remote from the bearing 31 an abutment 32, against one surface of which the latching element 19 is arranged to bear when occupying its latching position.

As previously mentioned, if desired, axial movement of the steering wheel 16 and the upper steering shaft section 15 may be assisted by spring means. Accordingly, both illustrated embodiments include a coil spring 33 acting between a substantially immovable abutment surface arranged externally of the sleeve 30 and the free surface of the abutment 32 located on the sleeve 30. Thus, when the latching element 19 is released from its latching position by the toggle link arrangement 22 in the aforedescribed manner, the force exerted by the spring 33 on the sleeve 30 via the abutment 32 assists the mass forces acting on the upper steering shaft section 15 and the steering wheel to move the same to the safe position.

In both embodiments, the abutment surface arranged externally of the sleeve 30 and serving as one thrust surface for the spring 33 has the form of an annular shoulder 34 mounted to a further sleeve 35. The sleeve 35 extends over a substantial length of the sleeve 30 and is provided with a bearing means 36 attached to the sleeve 35 by screws or the like and permitting rotary movement of the lower steering shaft section 17. The sleeve 35 is fixed against axial movement by appropriate means not shown and is provided with an opening 37 to permit movement of the latching element into and out of engagement with the abutment 32.

As previously indicated, to safeguard against possible rebound of the upper steering shaft section 15, and thus also the steering wheel 16, from the safe position towards the normal steering position once the latching means is released, there may be provided in accordance with the invention a device which while permitting axial movement of the upper shaft section 15 towards the safe position effectively prevents movement of the upper shaft section in the reverse direction. A suitable device for this purpose is shown in the drawings and, for example, comprises a segmented or yielding frusto-conical insert 38 loosely inserted between the non-movable annular abutment 34 and the sleeve 30. As will be seen from the drawings, the inner surfaces of the abutment 34 conform with the outer surfaces of the insert 38, so that while the sleeve 30 is able to move axially downwards towards the safe position, as a result of slight friction forces acting between the insert 38 and the sleeve 30, any movement of the sleeve 30 towards the normal steering position will cause deformation of the insert against the sleeve, thereby effectively wedging the same against continued movement.

In the second embodiment, shown in FIG. 2, the means latching the upper shaft section 15 against axial movement towards the safe position comprises a latching element, in the form of a pin or stud 40 for example, which carries an explosive charge 41 and which, in response to a signal transmitted by an electronic device 43, 44, 45 sensitive at 46 to vehicle retardation forces of a predetermined magnitude and located in the front portion 42 of the vehicle for instance, is caused to explode and disintegrate, thereby releasing the upper steering shaft section 15 and the steering wheel 16 attached thereto for immediate movement to the safe position as a result of the mass forces acting thereon.

Although the latching means of the illustrated embodiments acts on the upper steering shaft section via the sleeve 30, it also lies within the purview of the invention to cause the latching means to act directly on the upper steering shaft section 15. For example, it is conceivable that the upper steering shaft section 15 is provided with a circumferentially extending collar and that the latching element has the form of a spring-loaded roller, for example, engaging the under surface of the annular collar to prevent downward axial movement of said shaft section. Neither is the improvement of the present invention solely applicable to split steering shaft assemblies with which the upper and lower shaft sections are coaxial, but can be applied equally as well to shaft assemblies with which the shaft sections are offset in relation to each other.

What is claimed is:

1. A collapsible steering wheel system comprising a steering wheel and a steering shaft assembly extending between the steering wheel and movement transmission means for transmitting rotary movement of the steering wheel and the steering shaft assembly to the vehicle wheels, the steering shaft assembly comprising upper and lower shaft sections, said upper section being attached to the steering wheel, means mounting said upper section for free axial movement relative to said lower shaft section from a first upper steering position to a second lower safe position, latching means releasably holding the upper shaft section in said first position, and means responsive to vehicle retardation forces for releasing said latching means when said retardation forces exceed a predetermined magnitude thereby to permit free movement of said upper shaft section to said second position.

2. A collapsible vehicle-steering system according to claim 1, wherein the upper and lower shaft sections are co-axial and arranged for telescopic movement in relation to each other.

3. A collapsible vehicle-steering system according to claim 1, wherein the upper steering shaft section is movable to said second safe position under its own weight and the weight of the steering wheel attached thereto.

4. A collapsible vehicle-steering system according to claim 1, wherein said upper steering shaft section is spring biassed towards said second, safe position.

5. A collapsible vehicle-steering system according to claim 1, wherein the releaseable latching means includes a sleeve that acts on the upper steering shaft section, said sleeve extending over said section and being arranged for axial movement therewith but being locked against rotation about its own longitudinal axis.

6. A collapsible vehicle-steering system according to claim 5, and a spring acting between a first abutment surface arranged externally of the sleeve and being immovable relative thereto, and a second abutment surface located on said sleeve to urge said upper section toward said second position.

7. A collapsible vehicle-steering system according to claim 6, wherein said second abutment surface prevents return movement of the upper steering shaft section from the second safe position towards the first, normal steering position.

8. A collapsible vehicle-steering system according to claim 1, wherein the latch release means comprises a movable weight which, upon the occurrence of vehicle retardation forces above a predetermined magnitude, as a result of the inertia forces acting thereon causes the latching means to release the upper steering shaft section for movement of said section to said second, safe position.

9. A collapsible vehicle-steering system according to claim 1, wherein the latching means comprises a latching element co-acting with a toggle link arrangement which in a first position holds the latching element in its active latching position and in a second position releases said latching element from said latching position.

10. A collapsible vehicle-steering system according to claim 9, said latch release means comprising a movable weight connected to said toggle link arrangement in a manner to move said toggle link arrangement from its first position to its second position by the inertia forces acting on the weight as the result of vehicle retardation forces above a predetermined magnitude.

11. A collapsible vehicle-steering system according to claim 9, wherein the latching element has two edge surfaces extending to subtend an angle therebetween and is pivotally mounted to a fixed point on the vehicle, one of said edge surfaces being arranged to latch the upper steering shaft section against movement from the first normal steering position towards the second, safe position, and the other edge surface engaging the toggle link arrangement to retain the latching member in its operative, latching position.

12. A collapsible vehicle-steering system according to claim 6, wherein the upper steering shaft section and the lower shaft section are splined, one of said sections being of hollow construction and arranged for telescopic movement with the other steering shaft section, said lower steering shaft section being encircled by an axially immovable further sleeve extending over at least a considerable length of the first mentioned sleeve and embodying said first, spring abutment surface.

* * * * *